Figure 1:
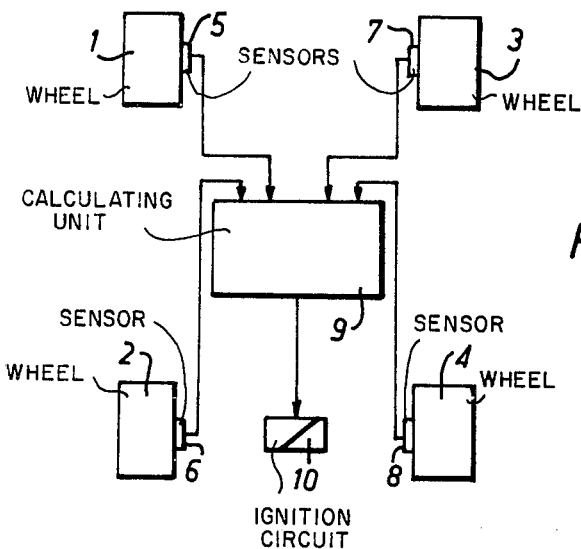

United States Patent [19]
Boudeville et al.

[11] 3,938,612
[45] Feb. 17, 1976

[54] ANTI-SKID SYSTEM FOR THE DRIVING WHEELS OF AUTOMOTIVE VEHICLES

[75] Inventors: Jean-Claude Boudeville; Jacques Gelin, both of Billancourt, France

[73] Assignees: Regie Nationale des Usines Renault; Automobiles Peugeot, both of France

[22] Filed: Apr. 24, 1973

[21] Appl. No.: 353,936

[30] Foreign Application Priority Data
May 3, 1972    France .............................. 72.15714

[52] U.S. Cl. ....... 180/82 R; 180/105 E; 188/181 C; 235/150.2; 303/21 EB
[51] Int. Cl.² ........................................ B60K 31/00
[58] Field of Search ............ 180/54 R, 82 R, 105 E; 188/181 C; 235/150.2, 151.32; 246/182 C; 303/21 BE, 21 EB, 21 CF; 317/5; 318/52; 324/161, 169; 340/52 R, 53, 262

[56] References Cited
UNITED STATES PATENTS

| | | | |
|---|---|---|---|
| 3,586,385 | 6/1971 | Florus et al. ..................... | 303/21 BE |
| 3,608,978 | 9/1971 | Neisch ............................. | 303/21 EB |
| 3,622,973 | 11/1971 | Domann et al. .................. | 340/52 R |
| 3,680,655 | 8/1972 | Beyerlein et al. ............ | 180/105 E X |
| 3,706,351 | 12/1972 | Neisch ........................... | 180/82 R X |
| 3,735,200 | 5/1973 | Kritz ....................................... | 317/5 |
| 3,764,182 | 10/1973 | Andreyko et al. .............. | 303/21 EB |
| 3,776,357 | 12/1973 | Arai et al. .......................... | 180/82 R |
| 3,776,604 | 12/1973 | Ooya et al. ...................... | 303/21 EB |
| 3,779,331 | 12/1973 | Burckhardt et al. .............. | 180/82 R |

*Primary Examiner*—Trygve M. Blix
*Assistant Examiner*—Stephen G. Kunin
*Attorney, Agent, or Firm*—Stevens, Davis, Miller & Mosher

[57] ABSTRACT

An anti-skid system for a motor vehicle having a driving wheel and a non-driving wheel to protect the driving wheel from skidding. The system includes a first sensor for generating a number of pulses proportional to the peripheral distance traveled by the driving wheel, a second sensor for generating a number of pulses proportional to the peripheral distance traveled by the non-driving wheel, the second sensor generating a higher number of pulses than the first sensor for the same peripheral distance traveled by the respective driving and non-driving wheels, and a unit, responsive to the signals generated by said first and second sensors, for detecting the difference in peripheral distance traveled by the driving and non-driving wheels independently of time. The detecting unit includes a circuit for producing a delay in the ignition system when the difference in peripheral distance traveled is greater than a predetermined value to adjust engine torque and to maintain optimum road adherence of the wheels.

7 Claims, 2 Drawing Figures

U.S. Patent  Feb 17, 1976  3,938,612

ANTI-SKID SYSTEM FOR THE DRIVING WHEELS OF AUTOMOTIVE VEHICLES

The present invention relates in general to systems for protecting the driving wheels of a motor vehicles against undue skidding. More particularly, this invention is directed to provide a novel anti-skid system for the driving wheels of motor vehicles.

In a motor vehicle a relatively powerful engine torque may under certain conditions such as of poor road adherence cause the driving wheels to skid on the road surface. In known devices the loss of adherence information is delivered by sensors detecting the threshold of acceleration or the speed differential. Such information is subordinate to the road surface condition and also to the absolute speed of the vehicle. On the other hand, the regulating control action is exerted either on mechanical members such as the induction control throttle valve (having a relatively high response time) or by cutting off the ignition, which may be detrimental to the engine and increase the atmospheric pollution.

These inconveniences are avoided by the system of this invention which comprises an electronic unit adapted to generate a signal each time the driving wheels rotate faster than the non-driving wheels by a predetermined minimum value or, in other words, each time the driving wheels accomplish a fraction of a revolution more than the non-driving wheels. These signals in pulse form control a delay in the ignition signal, thus causing a reduction in the engine torque.

Figure 2:
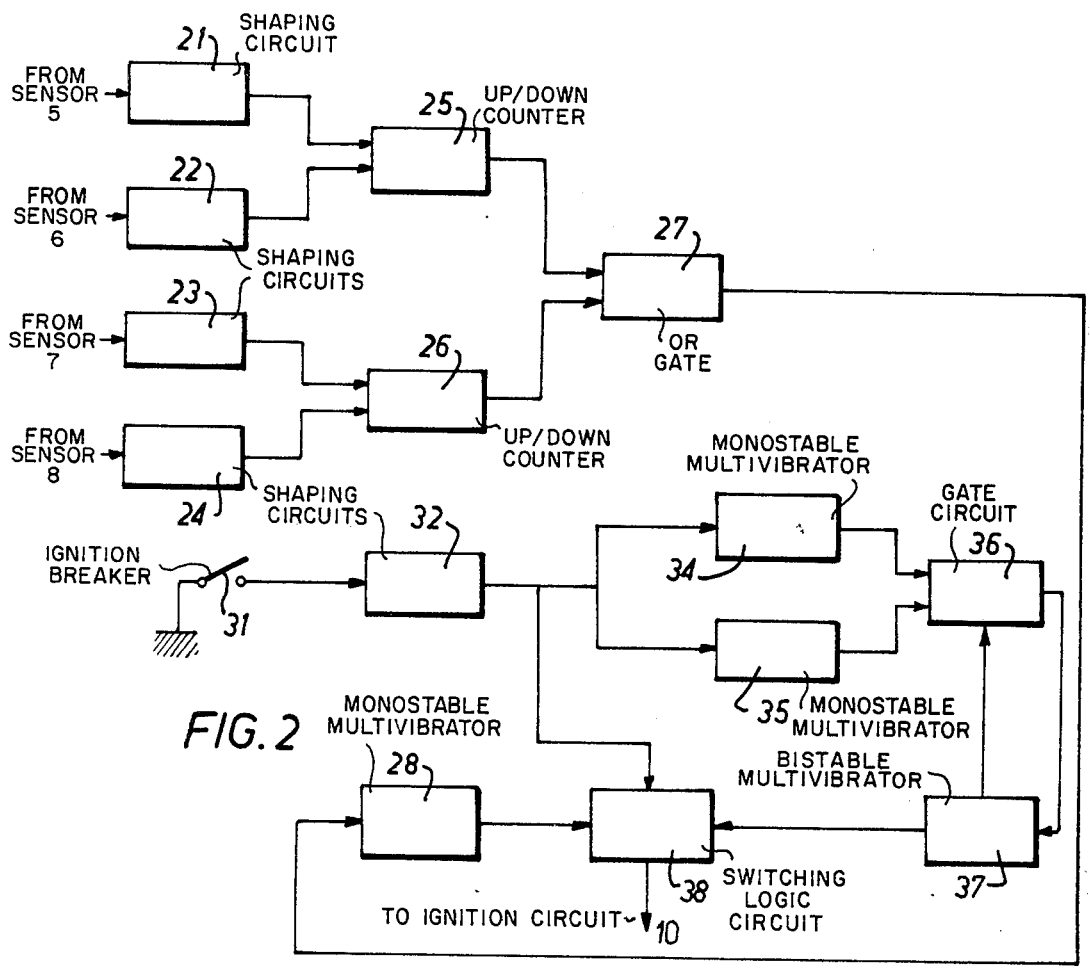

A clearer understanding of this invention will be had as the following description proceeds with reference to the accompanying drawing, in which:

FIG. 1 illustrates diagrammatically the basic principle of the system of this invention, and FIG. 2 illustrates in block diagram form the electronic unit designated by the reference numeral 9 in FIG. 1.

In FIG. 1, a motor vehicle to be protected against wheel skid comprises four wheels 1, 2, 3, 4, the driving wheels being for example the wheels 1 and 3, the non-driving wheels being the other wheels 2 and 4. Sensors 5, 6 and 7, 8 are associated with the wheels 1, 2, 3 and 4, respectively. Each wheel is thus provided with a sensor generating a number of pulses proportional to the angle of rotation of the corresponding wheel, the proportionality factor differring if desired in the case of the driving wheels and non-driving wheels, as will be explained hereinafter. Sensors of this character are well known in the technique of pulse generation. These pulses are processed in an electronic unit 9 controlling the delay in the ignition circuit shown diagrammatically and in block form at 10.

FIG. 2 illustrates a typical form of embodiment of the electronic unit 9 of FIG. 1. Shaping circuits 21, 22, 23, 24 are connected to sensors 5, 6, 7 and 8, respectively. Circuits 21 and 22 are connected to an up/down counter 25, and circuits 23 and 24 are connected to another up/down counter 26. Both counters 25, 26 receiving pulse signals from the sensors of a driving wheel and of a non-driving wheel, respectively, via circuits 21, 22, 23 and 24, are connected to an OR gate 27 connected to a monostable multivibrator 28 having its output connected to a switching logic circuit 38.

The ignition breaker 31 is connected to an ignition signal shaping circuit 32. The output of this lastnamed circuit is connected on the one hand to one input of circuit 38 and on the other hand to a pair of monostable multivibrators 34 and 35 of which monostable multivibrator 34 is triggered by the first front of the signal received from 32 and monostable multivibrator 35 is triggered by the second front. These monostable multivibrators 34 and 35 generate signals of equal duration. Their outputs are connected to a gate circuit 36 connected in turn to a bistable multivibrator 37 having its output connected to said circuit 38. The output of circuit 38 is connected to the ignition circuit 10.

This device operates as follows:

When no wheel-skid occurs, that is, under normal driving or operating conditions, the sensors of the driving wheels generate a number of pulses proportional to the angle, or more exactly to the peripheral travel accomplished by these wheels, said number being slightly inferior to the number of pulses generated by the sensors of the non-driving wheels. This is obtained as explained hereinabove by giving different values to the proportionality factors between the number of pulses and the number of revolutions of the driving and non-driving wheels.

The up/down counters 25 and 26 are so constructed that when the frequency of the up counting pulses is lower than the frequency of the down counting pulses, they remain at zero, and when the number of up pulses counting exceeds by a predetermined amount those counted in the down direction, a pulse signal is generated at the output and these counters are reset automatically or set to a predetermined value. Then the process may be resumed. Thus, for each pair of wheels 1, 2 and 3, 4 a pulse is obtained at the outputs of the relevant counters 25 and 26 each time a driving wheel has accomplished a fraction of revolution more than a non-driving wheel. This pulse actuates the monostable multivibrator 28 which is of the so-called retriggerable type, well-known in the electronic field. The signal generated by monostable multivibrator 28 controls the circuit 38. When this signal is not produced, the circuit 38 is controlled by the output of circuit 32 whereby the ignition takes place without any time lag. When this signal is generated and throughout its duration the circuit 38 is controlled by the output of circuit 37 as soon as this signal appears, thus determining the time when the ignition begins to take place with a predetermined delay whereas the duration of the pulses emitted by monostable multivibrators 34 and 35 determines the value of this ignition delay. The circuits 36 and 37 are so interconnected that the output pulse from 34 will trigger with its falling edge the bistable circuit 37. The change produced in the state of its output will act upon the other circuit 36, whereby circuit 37 will subsequently be triggered by the falling edge of the output signal of 35, the return of the output of circuit 37 restoring the circuit 36 in the condition required for producing another cycle.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed is:

1. An anti-skid system for a motor vehicle having an ignition system, a driving wheel and a non-driving wheel, said anti-skid system protecting the driving wheel from skidding, said anti-skid system comprising a first sensor for generating a number of pulses proportional to the peripheral distance traveled by the driving wheel, a second sensor for generating a number of pulses proportional to the peripheral distance traveled by the non-driving wheel, the second sensor generating a higher number of pulses than the first sensor for the same peripheral distance traveled by the respective driving and non-driving wheels, and a calculating unit means, responsive to the signals generated by said first and second sensors, for detecting the difference in peripheral distance traveled by the driving and non-driving wheels independently of time, said detecting means including means for producing a delay in the ignition system when said difference in peripheral distance traveled is greater than a predetermined value to adjust engine torque and to maintain optimum road adherence of the wheels and wherein said detecting means includes means for constantly comparing the pulses generated by the first sensor and the pulses generated by the second sensor, said comparing means including a counter connected to said first and second sensors wherein when the number of pulses generated by said second sensor exceeds the number of pulses generated by said first sensor, said counter is in a zero condition and when said counter receives a number of pulses from said first sensor which is greater by a predetermined amount than the number of pulses received from said second sensor, said counter generates a first signal, said detecting means also including a first monostable multivibrator for receiving said first signal, an ignition signal shaping circuit for generating an ignition signal, a time lag circuit, connected to said ignition signal shaping circuit, for generating a delayed ignition signal, and a switching logic circuit having inputs connected to each of said first monostable multivibrator, said ignition signal shaping circuit and said time lag circuit, said switching logic circuit being controlled by said delayed ignition signal when said first signal is applied to said first monostable multivibrator.

2. An anti-skid system according to claim 1, wherein said time lag circuit comprises one pair of monostable multivibrators connected to said ignition signal shaping circuit, a gate circuit connected to said pair of monostable multivibrators and a bistable multivibrator connected to said gate circuit and said switching logic circuit, said gate circuit and said bistable multivibrator determining a fixed time period in relation to a normal time period for delaying the ignition of a motor in the vehicle.

3. An anti-skid system according to claim 2, wherein said counter comprises an up/down counter having up counting and down counting inputs and wherein the pulses generated by the first and second sensors, respectively, are delivered to the up counting and down counting inputs, and when the number of pulses down counted is greater than the number of pulses up counted, said counter is in its zero condition.

4. An anti-skid system according to claim 3, wherein when the number of pulses up counted exceeds by a predetermined number the number of pulses down counted, said first signal is generated at the output of said counter and said counter is reset automatically.

5. An anti-skid system according to claim 3, wherein when the pulses up counted exceeds by a predetermined number the number of pulses down counted, said first signal is produced at the output of said counter and said counter is set to a predetermined value.

6. An anti-skid system according to claim 1 wherein said motor vehicle further includes two driving wheels and two non-driving wheels, said system further comprising third and fourth sensors for generating, respectively, pulses proportional to the distances traveled by the additional driving and non-driving wheels, said calculating unit means for detecting including means for detecting pulses generated by said third and fourth sensors.

7. An anti-skid system according to claim 1 wherein said motor vehicle further includes a plurality of driving wheels and a plurality of non-driving wheels, said system further comprising a plurality of sensors for generating, respectively, pulses proportional to the distances traveled by the plurality of driving and non-driving wheels, said calculating unit means for detecting including means for detecting pulses corresponding to the fastest driving wheel and the fastest non-driving wheel.

* * * * *